(12) United States Patent
Ogata et al.

(10) Patent No.: US 8,066,595 B2
(45) Date of Patent: Nov. 29, 2011

(54) HYDRAULIC CONTROL SYSTEM FOR VEHICULAR POWER TRANSMITTING MECHANISM

(75) Inventors: Yusuke Ogata, Toyota (JP); Yoshinobu Soga, Toyota (JP); Ryoji Habuchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 553 days.

(21) Appl. No.: 11/258,873

(22) Filed: Oct. 27, 2005

(65) Prior Publication Data

US 2006/0111207 A1 May 25, 2006

(30) Foreign Application Priority Data

Nov. 22, 2004 (JP) ................................. 2004-338166

(51) Int. Cl.
| | |
|---|---|
| F16H 59/00 | (2006.01) |
| F16H 61/00 | (2006.01) |
| F16H 63/00 | (2006.01) |
| F16H 7/22 | (2006.01) |
| F16H 7/08 | (2006.01) |
| F16H 61/662 | (2006.01) |
| F16H 61/26 | (2006.01) |

(52) U.S. Cl. .......... 474/28; 474/103; 474/104; 474/110; 477/45; 477/46; 477/48; 477/160; 477/163

(58) Field of Classification Search ................... 474/28, 474/51, 103, 110; 477/39, 45, 46, 48, 160, 477/163

See application file for complete search history.

(56) References Cited

U.S. PATENT DOCUMENTS

| | | | | |
|---|---|---|---|---|
| 5,006,093 A | * | 4/1991 | Itoh et al. ..................... | 474/28 |
| 5,050,715 A | * | 9/1991 | Itoh et al. ..................... | 192/3.3 |
| 5,183,439 A | * | 2/1993 | Yumoto et al. ................ | 474/28 |
| 5,609,543 A | * | 3/1997 | Aoki et al. .................... | 477/45 |
| 5,649,876 A | * | 7/1997 | Morishita ..................... | 474/28 |
| 5,674,150 A | | 10/1997 | Morishita et al. | |
| 5,776,028 A | * | 7/1998 | Matsuda et al. ............... | 477/45 |
| 6,406,402 B1 | * | 6/2002 | Eguchi et al. .................. | 477/45 |

(Continued)

FOREIGN PATENT DOCUMENTS

JP    A-8-219188    8/1996

(Continued)

*Primary Examiner* — Michael Mansen
*Assistant Examiner* — Henry Liu
(74) *Attorney, Agent, or Firm* — Oliff & Berridge, PLC

(57) ABSTRACT

A hydraulic control system for a vehicular drive system including a hydraulically operated belt-and-pulley type continuously variable transmission and a hydraulically operated frictional coupling device engaged for running of a vehicle, the hydraulic control system including: a first solenoid valve for regulating a belt-tensioning hydraulic pressure for tensioning a belt of the transmission, a second solenoid valve for regulating a transient coupling hydraulic pressure to be applied to the frictional coupling device in the process of an engaging action, a line-pressure regulating valve for regulating a line pressure used for hydraulically operated devices of the mechanism, and a hydraulic-circuit switching device operable to apply a control pressure of the second solenoid-operated valve to the line-pressure regulating valve after the frictional coupling device has been placed in a fully engaged state, and to apply a first control pressure of the first solenoid-operated valve to the line-pressure regulating valve while the frictional coupling device is in the process of the engaging action.

6 Claims, 6 Drawing Sheets

U.S. PATENT DOCUMENTS

| | | | |
|---|---|---|---|
| 6,612,958 B2 * | 9/2003 | Imai et al. | 475/210 |
| 6,739,998 B2 * | 5/2004 | Iwata et al. | 475/127 |
| 7,025,706 B2 * | 4/2006 | Katou | 477/45 |
| 7,104,907 B2 * | 9/2006 | Jozaki et al. | 474/28 |
| 7,306,538 B2 * | 12/2007 | Kodama et al. | 477/44 |
| 7,575,111 B2 * | 8/2009 | Ogata et al. | 192/3.3 |

FOREIGN PATENT DOCUMENTS

| | | | |
|---|---|---|---|
| JP | 10246317 A | * | 9/1998 |
| JP | A-11-182666 | | 7/1999 |
| JP | A 2002-181175 | | 6/2002 |

\* cited by examiner

HYDRAULIC CONTROL SYSTEM FOR VEHICULAR POWER TRANSMITTING MECHANISM

The present application is based on Japanese Patent Application No. 2004-338166 filed on Nov. 22, 2004, the contents of which are herein incorporated by reference.

BACKGROUND OF THE INVENTION

1. Field of the Invention

The present invention relates in general to a hydraulic control system for a vehicular power transmitting mechanism, and more particular to a hydraulic control system including two solenoid-operated valves for controlling a belt-tensioning hydraulic pressure for applying a tension to a belt of a continuously variable transmission of a belt-and-pulley type, a transient coupling hydraulic pressure of a frictional coupling device for establishing a power transmitting path, and a line pressure used for operating various hydraulically operated devices.

2. Discussion of the Related Art

JP-2002-181175A discloses an example of a hydraulic control system for a vehicular power transmitting mechanism including a continuously variable transmission of a belt-and-pulley type the speed ratio of which is continuously variable, and a hydraulically operated frictional coupling device which is engaged, for running of a vehicle, to establish a power transmitting path a portion of which is defined by the belt-and-pulley type continuously variable transmission. This hydraulic control system includes a single solenoid-operated valve for controlling a belt-tensioning hydraulic pressure for tensioning the belt of the continuously variable transmission, a transient coupling hydraulic pressure applied to the frictional coupling device for engaging the frictional coupling device, and a line pressure used for operating various hydraulically operated devices.

Where the same solenoid-operated valve is used for controlling the belt-tensioning hydraulic pressure and the transient coupling hydraulic pressure, as described above, these hydraulic pressures must be controlled such that a torque capacity of the belt of the continuously variable transmission is larger than a torque capacity of the frictional coupling device placed in the engaged state, in order to prevent slipping of the belt. Accordingly, when the transient coupling hydraulic pressure of the frictional coupling device is relatively high, the belt-tensioning hydraulic pressure of the continuously variable transmission may be unnecessarily high, giving rise to a risk of an increase of a load acting on the belt, consequent deterioration of durability of the belt, and reduction of power transmitting efficiency of the continuously variable transmission. The line pressure which is also controlled by the same solenoid-operated valve must be controlled on the basis of a higher one of the belt-tensioning hydraulic pressure and a transmission-shifting hydraulic pressure. The graph of FIG. 6 indicates an example of changes of the belt-tensioning hydraulic pressure Pout, a transmission-shifting hydraulic pressure Pin and the line pressure PL in relation to change of a speed ratio $\gamma$ of the continuously variable transmission. When the speed ratio $\gamma$ is relatively low, that is, when the continuously variable transmission is placed in a relatively high-gear state, the transmission-shifting hydraulic pressure Pin is generally higher than the belt-tensioning hydraulic pressure Pout. Where the relationship between the line pressure PL and the belt-tensioning hydraulic pressure Pout is determined on the basis of the transmission-shifting hydraulic pressure Pin when the speed ratio $\gamma$ is relatively low, the line pressure PL tends to be unnecessarily high when the speed ratio $\gamma$ is in a medium-to-high range in which the belt-tensioning hydraulic pressure Pout is higher than the transmission-shifting hydraulic pressure Pin, that is, when the continuously variable transmission is placed in a medium- to low-gear state, as indicated by one-dot chain line in FIG. 6. This tendency results in reduction of energy efficiency of the hydraulic system, and deterioration of fuel economy of the vehicle. The hydraulic characteristics indicated in FIG. 6 vary depending upon the specific configuration of the belt-and-pulley type continuously variable transmission.

SUMMARY OF THE INVENTION

The present invention was made in the light of the background art discussed above. It is therefore an object of the present invention to provide a hydraulic control system which has high energy efficiency and assures adequate control of the belt-tensioning pressure, transient engaging pressure and line pressure with a small number of solenoid-operated valves and high durability of the belt of the continuously variable transmission of belt-and-pulley type.

The objected indicated above may be achieved according to any one of the following modes of this invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only.

(1) A hydraulic control system for a vehicular power transmitting mechanism including a hydraulically operated continuously variable transmission of a belt-and-pulley type which includes a transmission belt and a speed ratio of which is continuously variable, and a hydraulically operated frictional coupling device which is engaged, for running of a vehicle, to establish a power transmitting path partially defined by the continuously variable transmission, the hydraulic control system comprising: (a) a first solenoid-operated valve operable to generate a first control pressure for regulating a belt-tensioning hydraulic pressure for applying a tension to the transmission belt of the continuously variable transmission; (b) a second solenoid-operated valve operable to generate a second control pressure for regulating a transient coupling hydraulic pressure to be applied to the frictional coupling device in the process of an engaging action from a fully released state to a fully engaged state; (c) a line-pressure regulating valve operable to regulate a line pressure used for hydraulically operated devices of the vehicular power transmitting mechanism; and (d) a hydraulic-circuit switching device operable to apply the second control pressure generated by the second solenoid-operated valve to the line-pressure regulating valve for regulating the line pressure, after the frictional coupling device has been placed in the fully engaged state, and to apply the first control pressure generated by the first solenoid-operated valve to the line-pressure regulating valve for regulating the line pressure while the frictional coupling device is in the process of the engaging action.

In the hydraulic control system of the present invention for the vehicular power transmitting mechanism, it is not necessary to regulate the transient coupling hydraulic pressure during the steady running of the vehicle while the frictional coupling device is held in its fully engaged state. Therefore, the line pressure can be regulated according to the second control pressure applied from the second solenoid-operated valve to the line-pressure regulating valve, while the belt-tensioning hydraulic pressure applied to the continuously variable transmission can be regulated by the first solenoid-operated valve. Accordingly, the line pressure and the belt-tensioning hydraulic pressure can be adequately regulated. Although the line pressure may rise to an unnecessarily high level in the process of the engaging action of the frictional coupling device when the speed ratio of the continuously variable transmission is relatively high, the line pressure can be adequately regulated after the frictional coupling device has been placed in the fully engaged state, so that the overall energy efficiency of the hydraulic system is significantly improved.

When the frictional coupling device is switched from its fully released state to its fully engaged state during starting of the vehicle, for example, the line pressure as well as the belt-tensioning hydraulic pressure is regulated by the first solenoid-operated valve, with the first control pressure being applied to the line-pressure regulating valve, while the transient coupling hydraulic pressure of the frictional coupling device is regulated by the second solenoid operated valve. Accordingly, an increase of the transient coupling hydraulic pressure will not cause an increase of the belt-tensioning hydraulic pressure to an unnecessarily high level, so that the durability of the belt and the power transmitting efficiency of the continuously variable transmission are improved. Although the use of the first solenoid-operated valve SLS for regulating both of the belt-tensioning hydraulic pressure and the line pressure causes an unnecessarily increase of the line pressure in the process of the engaging or coupling action of the frictional coupling device to its fully engaged state while the speed ratio of the transmission is relatively high (while the transmission is in a relatively low-gear state), this occurs only in the process of the engaging action of the frictional coupling device, and the line pressure can be adequately regulated after the frictional coupling device has been fully engaged, so that the overall energy efficiency of the hydraulic system is significantly improved.

The hydraulic control system of the present embodiment is further arranged to use the two solenoid-operated valves for regulating the belt-tensioning hydraulic pressure, the transient coupling hydraulic pressure of the frictional coupling device and the line pressure, so that the present hydraulic control system can be made more compact and smaller in size, and is available at a lower cost of manufacture, than a hydraulic control system using three linear solenoid valves for regulating the above-indicated three pressures, respectively.

(2) The hydraulic control system according to the above-described mode (1), further comprising (e) a coupling-pressure regulating valve operable to generate a coupling hydraulic pressure to be applied to the frictional coupling device placed in the fully engaged state, and wherein the hydraulic-circuit switching device includes (d-1) a control-pressure switching valve which is arranged to receive the first control pressure, the second control pressure and the coupling hydraulic pressure and which has a normal state in which the second control pressure is applied to the line-pressure regulating valve while the coupling hydraulic pressure is applied to the frictional coupling device, and a control state in which the first control pressure is applied to the line-pressure regulating valve while the second control pressure is applied as the transient coupling hydraulic pressure, to the frictional coupling device, and (d-2) a switching control portion operable to place the control-pressure switching valve in the normal state after the frictional coupling device has been placed in the fully engaged state, and in the control state while the frictional coupling device is in the process of the engaging action.

In the hydraulic control system according to the above mode (2) of this invention, the control-pressure switching valve is used to not only selectively apply the first and second control pressures to the line-pressure regulating valve, but also selectively apply the coupling hydraulic pressure and the transient coupling hydraulic pressure (second control pressure) to the frictional coupling device, so that the present hydraulic control system can be made further compact, small-sized and inexpensive.

The continuously variable transmission of the belt-and-pulley type may be arranged to change its speed ratio by controlling the hydraulic pressure to be applied an input-side hydraulic cylinder for an input-side variable-diameter pulley, and to adjust the tension of the transmission belt by controlling the hydraulic pressure to be applied to an output-side hydraulic cylinder for an output-side variable-diameter pulley. However, the tension of the transmission belt may be hydraulically adjusted otherwise, without using the output-side hydraulic cylinder. The frictional coupling device may be a forward-drive clutch which is engaged to place a forward/reverse switching device in a forward-drive state for forward running of the vehicle, or a reverse-drive brake which is engaged to place the forward/reverse switching device in a reverse-drive state for reverse running of the vehicle. The forward/reverse switching device may be disposed between the belt-and-pulley type continuously variable transmission and a drive power source, or between the continuously variable transmission and drive wheels of the vehicle. The vehicular power transmitting mechanism may include a speed reducing device and/or a speed increasing device, in addition to the belt-and-pulley type continuously variable transmission.

(3) The hydraulic control system according to the above-described mode (1) or (2), wherein the first solenoid-operated valve is a linear solenoid valve the first control pressure of which is continuously variable with a change of an amount of electric current applied thereto.

(4) The hydraulic control system according to the above-described mode (1) or (2), wherein the second solenoid-operated valve is a linear solenoid valve the first control pressure of which is continuously variable with a change of an amount of electric current applied thereto.

However, the first and second solenoid-operated valves may be on-off solenoid valves the duty ratios of which are controlled to change the first and second control pressures. The first and second control pressures may be applied directly to the frictional coupling device and the belt-and-pulley type continuously variable transmission, but may be controlled by suitable pressure control valves that are operated according to the received first and second control pressures received as pilot pressures, so that the thus controlled control pressures generated by the pressure control valves are applied to the frictional coupling device and the continuously variable transmission.

The control-pressure switching valve provided in the hydraulic control system according to the above-described mode (2) has not only a function of selectively applying the first and second control pressures to the line-pressure regulating valve, but also a function of selectively applying the coupling hydraulic pressure and the transient coupling hydraulic pressure (second control pressure) to the frictional coupling device. However, the hydraulic-circuit switching device may include a control-pressure switching valve having only the function of selectively applying the first and second control pressures to the line-pressure regulating valve. In this case, another switching valve is provided to selectively apply the coupling hydraulic pressure and the transient coupling hydraulic pressure to the frictional coupling device, depending upon whether the frictional coupling device has been fully engaged or not. The transient coupling hydraulic pressure used in the case may be the second control pressure generated by the second solenoid-operated valve, or a pressure controlled according to the second control pressure used as a pilot pressure.

(5) The hydraulic control system according to the above-described mode (2), wherein the coupling-pressure regulating device receives the second control pressure when the control-pressure switching valve is placed in the normal state, the coupling-pressure regulating device generating the coupling hydraulic pressure such that the generated coupling hydraulic pressure changes according to the second control pressure.

The coupling-pressure regulating device may be arranged to generate a predetermined fixed coupling hydraulic pressure which is determined by a biasing force of a biasing member such as a spring. Alternatively, the coupling-pressure regulating device may change the coupling hydraulic pressure according to any pilot pressure other than the second control pressure generated by the second solenoid-operated valve.

(6) The hydraulic control system according to the above-described mode (2), further comprising an on-off solenoid valve operable to generate a pilot pressure, and wherein the control-pressure switching valve is placed selectively in the normal state and the control state, depending upon whether the pilot pressure is present or not.

The control-pressure switching valve may have a spool which is moved selectively to a position of the normal state and a position of the control state, by an electromagnetic force generated by a solenoid device.

(7) The hydraulic control system according to the above-described mode (2), wherein the switching control portion includes determining means for determining whether the frictional coupling device is held in the fully engaged state or in the process of the engaging action, depending upon whether a shift lever provided for manually controlling the vehicular power transmitting mechanism is held in a drive position or has been just operated from a neutral position to the drive position.

BRIEF DESCRIPTION OF THE DRAWINGS

The above and other objects, features, advantages and technical and industrial significance of the present invention will be better understood by reading the following detailed description of a preferred embodiment of this invention, when considered in connection with the accompanying drawings, in which.

DETAILED DESCRIPTION OF THE PREFERRED EMBODIMENT

Figure 1:
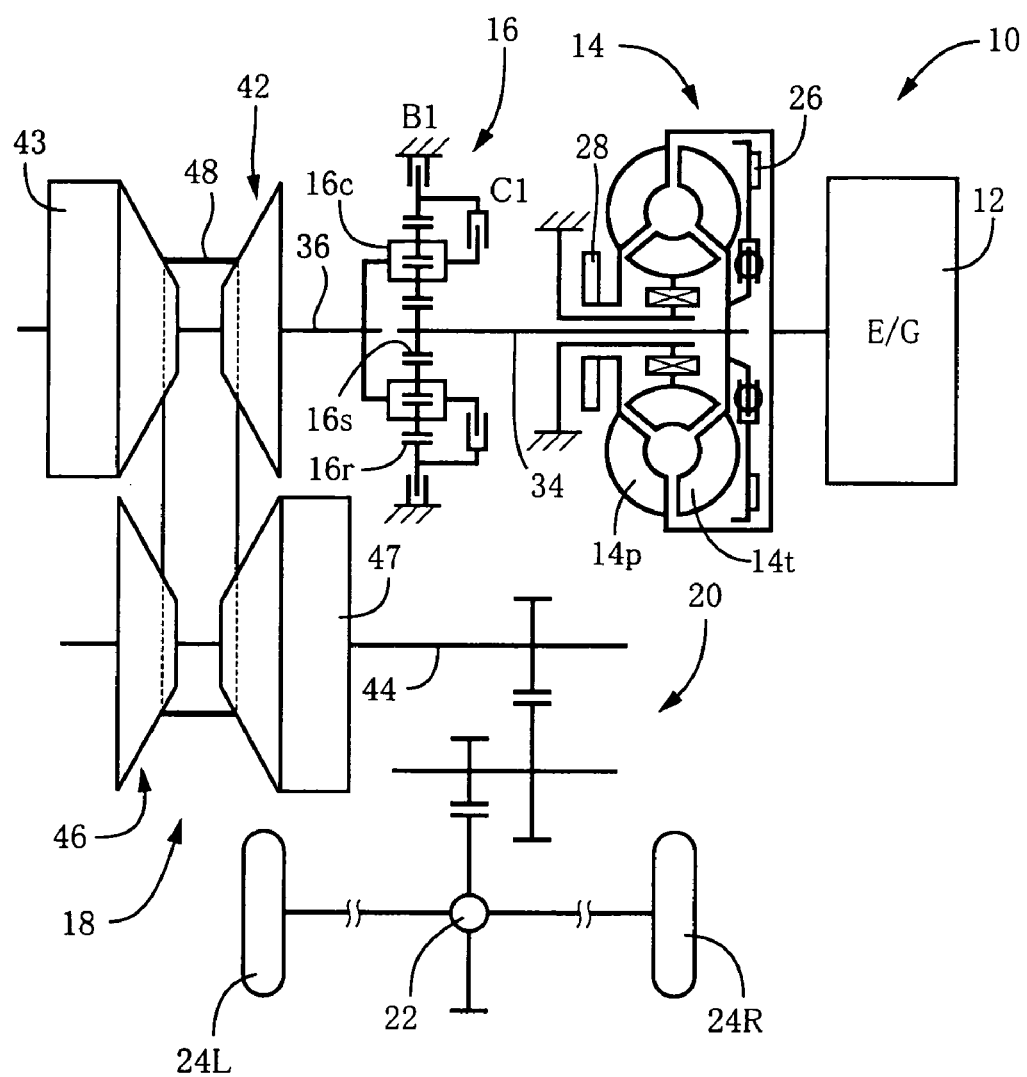
FIG. 1 is a view schematically showing a vehicular drive system including a hydraulic control system according to one embodiment of the present invention.

Referring first to FIG. 1, there is schematically shown a vehicular drive system 10 including a hydraulic control system constructed according to one embodiment of this invention. This vehicular drive system 10 is of a transverse type, and is suitably used for an FF type vehicle (front-engine front-drive vehicle). The drive system 10 includes a drive power source in the form of an internal combustion engine 12, a torque converter 14, a forward/reverse switching device 16, a continuously variable transmission (CVT) 18 of a belt-and-pulley type, a speed reducing gear device 20, and a differential gear device 22. An output of the engine 12 is transmitted and distributed to right and left drive wheels 24R and 24L through those devices 14, 16, 18, 20, 22. The forward/reverse switching device 16, belt-and-pulley type continuously variable transmission 18 and speed reducing gear device 20 constitute a major portion of a power transmitting mechanism.

The torque converter 14 includes a pump impeller 14p connected to a crankshaft of the engine 12, and a turbine impeller 14t connected to the forward/reverse switching device 16 through a turbine shaft 34. The torque converter 14 is a fluid coupling arranged to transmit a torque received from the engine 12 to the forward/reverse switching device 16, via a fluid. Between the pump and turbine impellers 14p, 14t, there is disposed a lock-up clutch 26 which is placed in an engaged state for rotation of the pump and turbine impellers 14p, 14t as a unit. An oil pump 28 of mechanical type is connected to and driven by the turbine impeller 14p, to supply a pressurized working fluid used to shift the belt-and-pulley type continuously variable transmission 18, to apply a tension to its belt 48, and to lubricate various hydraulic devices or components.

The forward/reverse switching device 16 is constituted by a planetary gear set of a double-pinion type. This planetary gear set includes a sun gear 16s connected to the turbine shaft 34 of the torque converter 14, a carrier 16c connected to the input shaft 36 of the belt-and-pulley type continuously variable transmission 18, and a ring gear 16r. A forward-drive clutch C1 is interposed between the carrier 16c and the ring gear 16r. For running the vehicle in the forward direction, the forward-drive clutch C1 is engaged for rotation of the planetary gear set as a whole, so that the turbine shaft 34 is connected to the input shaft 36 through the planetary gear set, whereby a forward drive force is transmitted to the right and left drive wheels 24R, 24L. For running the vehicle in the reverse direction, a reverse-drive brake B1 interposed between the ring gear 16r and the housing of the planetary gear set is engaged while the forward-drive clutch C1 is released, so that the input shaft 36 is rotated in a direction opposite to the direction of rotation of the turbine shaft 34, whereby a reverse drive force is transmitted to the right and left drive wheels 24R, 24L. When the forward-drive clutch C1 and the reverse-drive brake B1 are both released, the belt-and-pulley type continuously variable transmission 18 is disconnected from the engine 12. Each of the forward-drive clutch C1 and reverse-drive brake B1 is a hydraulically operated frictional coupling device of a wet, multiple-disc type including a plurality of friction plates which are forced against each other by a hydraulic actuator.

The belt-and-pulley continuously variable transmission 18 includes an input-side variable-diameter pulley 42 mounted on the input shaft 36, an output-side variable-diameter pulley 46 mounted on an output shaft 44, an input-side hydraulic cylinder 43, an output-side hydraulic cylinder 47, and a power transmitting member in the form of a transmission belt 48 connecting the two variable-diameter pulleys 42, 46. Each of the input-side and output-side variable-diameter pulleys 42, 46 has a V-groove the width of which is variable by actuation of the corresponding input-side or output-side hydraulic cylinder 43, 47. A rotary motion of the input shaft 36 is transmitted to the output shaft 44 through a friction force between the variable-diameter pulleys 42, 46 and the transmission belt 48. The widths of the V-grooves of the variable-diameter pulleys 42, 46 are changed according to a hydraulic pressure Pin which is applied to the input-side hydraulic cylinder 43, as a transmission-shifting hydraulic pressure, so that the effective diameters of the variable-diameter pulleys 42, 46 connected to each other by the transmission belt 48 are changed, whereby a speed ratio .gamma. of the continuously variable transmission 18 is continuously changed according to the transmission-shifting pressure Pin. The speed ratio .gamma. is defined as a ratio of a rotating speed Nin of the input shaft 36 to a rotating speed Nout of the output shaft 44. A hydraulic pressure Pout applied to the output-side hydraulic cylinder 47 functions as a belt-tensioning hydraulic pressure for adjusting a tension of the transmission belt 48 so that a force of friction between the variable-diameter pulleys 42, 46 and the transmission belt 48 is adjusted to transmit a torque between the input-side and output-side variable-diameter pulleys 42, 46, without slipping of the transmission belt 48 on the variable-diameter pulleys 42, 46. The hydraulic cylinders 43, 47 are connected to a hydraulic control unit 30 shown in FIG. 2, which is controlled according to control signals received from an electronic control device 50, to control the transmission-shifting hydraulic pressure Pin and the belt-tensioning hydraulic pressure Pout.

Figure 2:
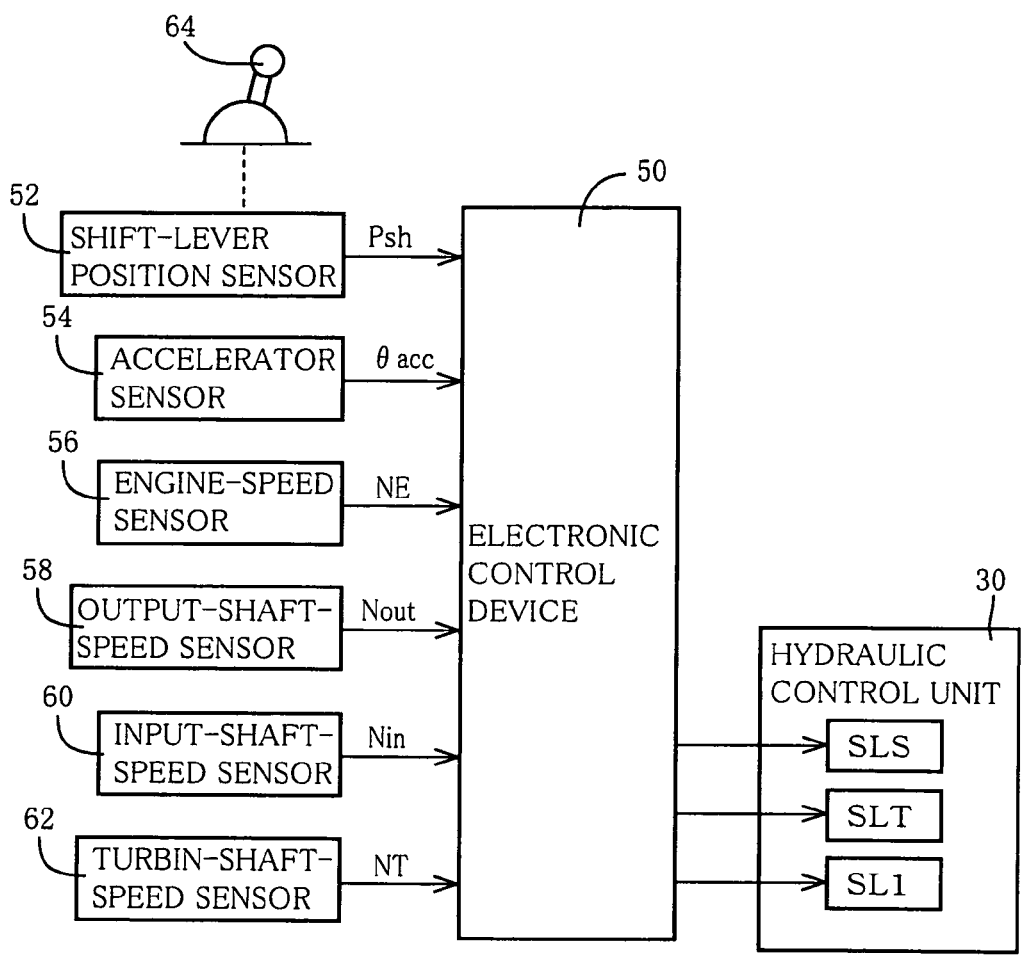
FIG. 2 is a block diagram illustrating the hydraulic control system for the vehicular drive system of FIG. 1, which includes an electronic control device and a hydraulic control unit.

Referring to the block diagram of FIG. 2, the electronic control device 50 is principally constituted by a so-called microcomputer, which includes a CPU, a ROM and a RAM. The CPU operates to perform signal processing operations according to control programs stored in the ROM while utilizing a temporary data storage function of the RAM, for controlling the speed ratio γ and the belt tension of the belt-and-pulley type continuously variable transmission 18, and the hydraulic pressures to be applied to the forward-drive clutch C1 and reverse-drive brake B1 of the forward/reverse switching device 16. To the electronic control device 50, there are connected a shift-lever-position sensor 52, an accelerator sensor 54, an engine-speed sensor 56, an output-shaft-speed sensor 58 (also functioning as a vehicle speed sensor), an input-shaft-speed sensor 60, and a turbine-shaft-speed sensor 62. The electronic control device 50 receives an output signal of the shift-lever-position sensor 52 indicative of a presently selected position Psh of a shift lever 64, an output signal of the accelerator sensor 54 indicative of an operating amount θacc of an accelerator pedal (not shown), an output signal of the engine-speed sensor 56 indicative of an operating speed NE of the engine 12, an output signal of the output-shaft-speed sensor 58 indicative of the speed Nout of the output shaft 44 (on which a running speed V of the vehicle can be obtained), an output signal of the input-shaft-speed sensor 60 indicative of the speed Nin of the input shaft 36, and an output signal of the turbine-shaft-speed sensor 62 indicative of a rotating speed NT of the turbine shaft 34. The shift lever 64 is positioned on one side of an operator of the vehicle. The shift lever 64 is manually operable by the operator to a selected one of operating positions Psh consisting of a parking position P, a reverse-drive position R, a neutral position N, and a forward-drive position D. It is noted that the operating amount θacc of the accelerator pedal corresponds to an output of the engine 12 (an output of the vehicle) as desired by the operator.

The hydraulic control unit 30 includes two linear solenoid valves SLS and SLT, and an on-off solenoid-operated valve SL1. The electronic control device 50 controls amounts of electric current to be applied to the linear solenoid valves SLS, SLT, to control output hydraulic pressures PSLS and PSLT of the valves SLS, SLT, and also selectively energizes or de-energizes the on-off solenoid valve SL1 to control an output hydraulic pressure of the valve SL1. The linear solenoid valves SLS, SLT respectively function as a first solenoid-operated valve and a second solenoid-operated valve, and the output hydraulic pressures PSLS, PSLT respectively correspond to a first control pressure and a second control pressure. The output hydraulic pressures PSLS and PSLT will be hereinafter referred to as control pressures.

Figure 3:
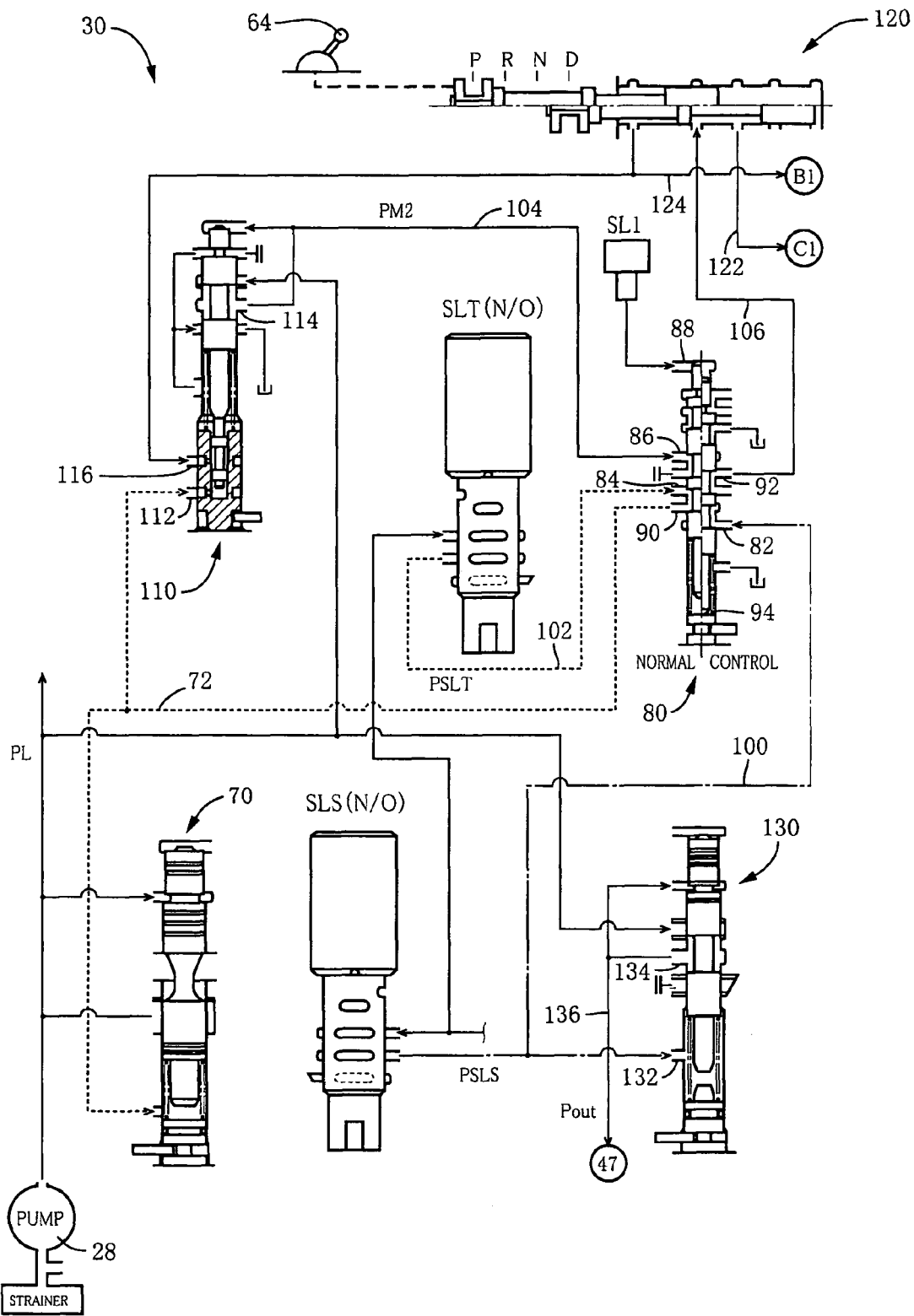
FIG. 3 is a hydraulic circuit diagram showing one state of the hydraulic control unit shown in FIG. 2.

Referring further to the hydraulic circuit diagram of FIG. 3, there is shown a portion of the hydraulic control unit 30, wherein the hydraulic pressure of the working fluid pressurized by the hydraulic pump 28 is regulated by a primary regulator valve 70 to a suitable line pressure PL, which is applied to the various hydraulically operated devices or components in the vehicular drive system 10. The primary regulator valve 70, which functions as a line-pressure regulating valve, receives one of the control pressures PSLS and PSLT of the linear solenoid valves SLS, SLT from a clutch-apply control valve 80 through a fluid passage 72, and regulates the line pressure PL according to the received hydraulic pressure PSLS, PSLT.

The clutch-apply control valve 80, which functions as a control-pressure switching valve, has four inputs ports 82, 84, 86, 88, and two output ports 90, 92. The input port 82 receives the output control pressure PSLS of the linear solenoid valve SLS through a fluid passage 100, and the input port 84 receives the output control pressure PSLT of the linear solenoid valve SLT through a fluid passage 102. The input port 86 receives a No. 2 modulator pressure PM2 from a line-pressure modulator No. 2 valve 110, and the input port 88 receives a pilot pressure from the on-off solenoid valve SL1. The output port 90 is connected to the primary regulator valve 70 and the line-pressure modulator No. 2 valve 110 through the fluid passage 72, and the output port 92 is connected to a manual valve 120 through a fluid passage 106.

Figure 4:
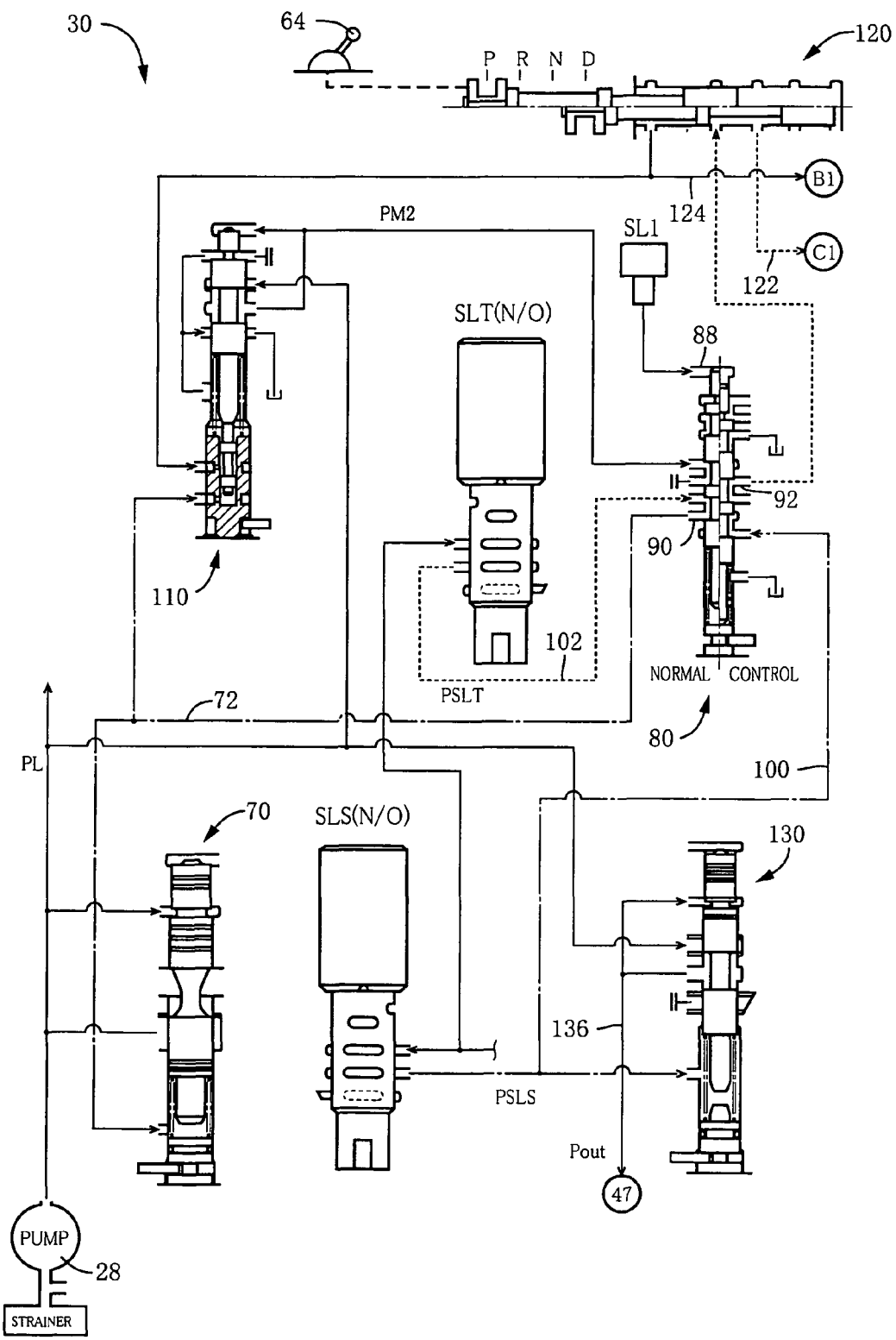
FIG. 4 is a hydraulic circuit diagram showing another state of the hydraulic control unit.

When the pilot pressure is not applied from the on-off solenoid valve SL1 to the input port 88 of the clutch-apply control valve 80, this control valve 88 is held in a normal state thereof with its spool held at a normal position (indicated at left in the drawing of the control valve 88 in FIG. 3) under a biasing action of a spring 94. In this normal state of the clutch-apply control valve 80, the control pressure PSLT received from the linear solenoid valve SLT is applied from the output port 90 to the primary regulator valve 70 and line-pressure modulator No. 2 valve 110, as indicated by broken line in FIG. 3, so that the line pressure PL and the No. 2 modulator pressure PM2 are controlled according to the control PSLT, and the thus controlled No. 2 modulator pressure PM2 applied from the line-pressure modulator No. 2 valve 110 to the clutch-apply control valve 80 is applied from the output port 92 to the above-indicated manual valve 120. When the pilot pressure is applied from the on-off solenoid valve SL1 to the input port 88, the clutch-apply control valve 80 is brought into a control state thereof with its spool moved to a control position (indicated at right in the drawing of the control valve 88) against the biasing force of the spring 94. In this control state, the control pressure PSLS received from the linear solenoid valve SLS is applied from the output port 90 to the primary regular valve 70 and the line-pressure modulator NO. 2 valve 110, as indicated by one-dot chain line in FIG. 4, so that the line pressure PL and the No. 2 modulator pressure PM2 are controlled according to the control pressure PSLS, and the control pressure PSLT received from the linear solenoid valve SLT is applied from the output port 92 to the manual valve 120, as indicated by broken line in FIG. 4.

The manual valve 120 is operatively connected to the shift lever 64 through a cable or a link, and is mechanically operated to one of three positions, according to the selected position Psh of the shift lever 64. These three positions of the manual valve 120 includes: an upper position (indicated in the drawing of the manual valve 120 in FIGS. 3 and 4) which is selected when the shift lever 64 is placed in the parking position P; a lower position (indicated in the drawing of the manual valve 120) which is selected when the shift lever 64 is placed in the forward-drive position D; and a position (not shown) which is selected when the shift lever 64 is placed in the reverse-drive position R. When the manual valve 120 is placed in the upper position, the above-described fluid passage 106 is not in communication with a forward-drive fluid passage 122 or a rear-drive fluid passage 124. When the manual valve 120 is placed in the lower position, the fluid passage 106 is in communication with the forward-drive fluid passage 122, so that the No. 2 modulator pressure PM2 or control pressure PSLT received from the clutch-apply control valve 80 is applied to the forward-drive clutch C1 through the forward-drive fluid passage 122, and the clutch C1 is brought into its engaged state. When the shift lever 64 is placed in the reverse-drive position R, the manual valve 120 is operated for communication of the fluid passage 106 to the reverse-drive fluid passage 124, so that the No. 2 modulator valve PM2 or the control pressure PSLT received from the clutch-apply control valve 80 is applied to the reverse-drive brake B1 through the fluid passage 124, and the brake B1 is brought into its engaged state.

The line-pressure modulator No. 2 valve 110 is provided to regulate the coupling or engaging hydraulic pressure of the forward-drive clutch C1 and the reverse-drive brake B1 when these clutch C1 and brake B1 are fully engaged. This line-pressure modulator No. 2 valve 110 has an input port 112 connected to the fluid passage 72 to receive the control pressure PSLT or PSLS, an output port 114 connected to the fluid passage 104, and an input port 116 connected to the reverse-drive fluid passage 124. The line-pressure modulator NO. 2 valve 110 controls the line pressure PL into the No. 2 modulator valve PM2 which is applied from the output port 114 to the clutch-apply control valve 80. The coupling hydraulic pressure (namely, the No. 2 modulator pressure PM2) applied to the reverse-drive brake B1 for reverse running of the vehicle is supplied to the input port 116, so that the No. 2 modulator pressure PM2 is controlled to be higher than the coupling hydraulic pressure to be applied to the forward-drive clutch C1.

The hydraulic control unit 30 further includes a line-pressure modulator No. 1 valve 130, which is provided to control the belt-tensioning hydraulic pressure Pout to be applied to the output-side hydraulic cylinder 47. The line-pressure modulator No. 1 valve 130 has an input port 132 connected to the fluid passage 100 to receive the control pressure PSLS, and an input port 134, and controls the line pressure PL according to the received control pressure PSLS, into the belt-tensioning hydraulic pressure Pout which is applied from the output port 134 to the output-side hydraulic cylinder 47 through a fluid passage 136.

Figure 5:
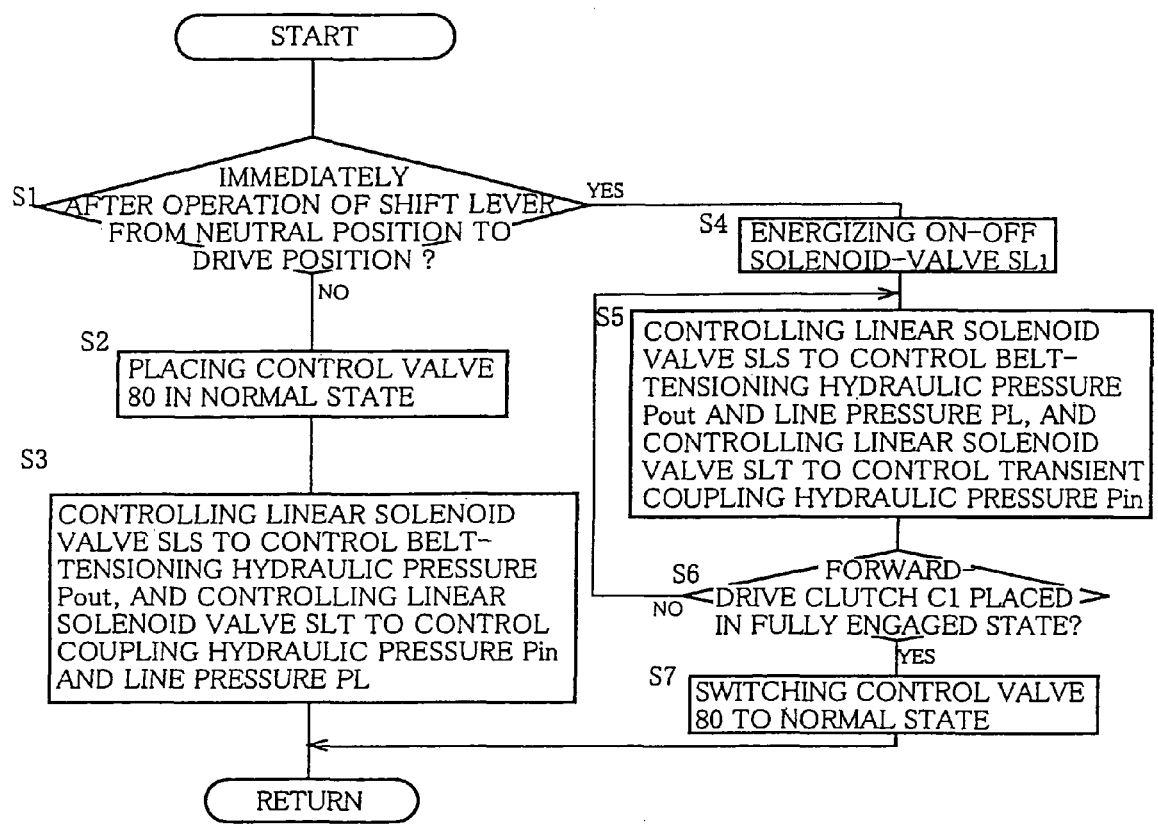
FIG. 5 is a flow chart illustrating an operation of the hydraulic control system to control linear solenoid valves SLS and SLT depending upon whether shift lever is placed is operated from neutral position to drive position.

The clutch-apply control valve 80 is controlled by the electric control device 50 according to a control routine illustrated in the flow chart of FIG. 5. This control routine is executed during forward running of the vehicle with the shift lever 64 placed in its forward-drive position D, and is initiated with step S1 to determine whether the shift lever 64 has just been operated from the neutral position N to the forward-drive position D, that is whether it is necessary to control a transient coupling hydraulic pressure to be applied to the forward-drive clutch C1 during starting of the vehicle, for example, for switching the forward-drive clutch C1 from its fully released state to its fully engaged state. If the shift lever 64 is presently placed in the forward-drive position D with the forward-drive clutch C1 already placed in the fully engaged state, that is, if the vehicle is in a steady forward-running state, a negative decision (NO) is obtained in step S1, and the control flow goes to step S2 in which the on-off solenoid valve SL1 is de-energized to inhibit the application of its pilot pressure to the clutch-apply control valve 80, so that this clutch-apply control valve 80 is placed in its normal state. As a result, the control pressure PSLT received from the linear solenoid valve SLT is applied from the output port 90 to the primary regulator valve 70 and the line-pressure modulator No. 2 valve 110, so that the line pressure PL and the No. 2 modulator pressure PM2 are regulated according to the control pressure PSLT. At the same time, the No. 2 modulator pressure PM2 received from the line-pressure modulator No. 2 valve 110 is applied from the output port 92 to the forward-drive clutch C1 through the manual valve 120, so that the forward-drive clutch C1 is held in its fully engaged state according to the No. 2 modulator valve PM2.

Figure 6:
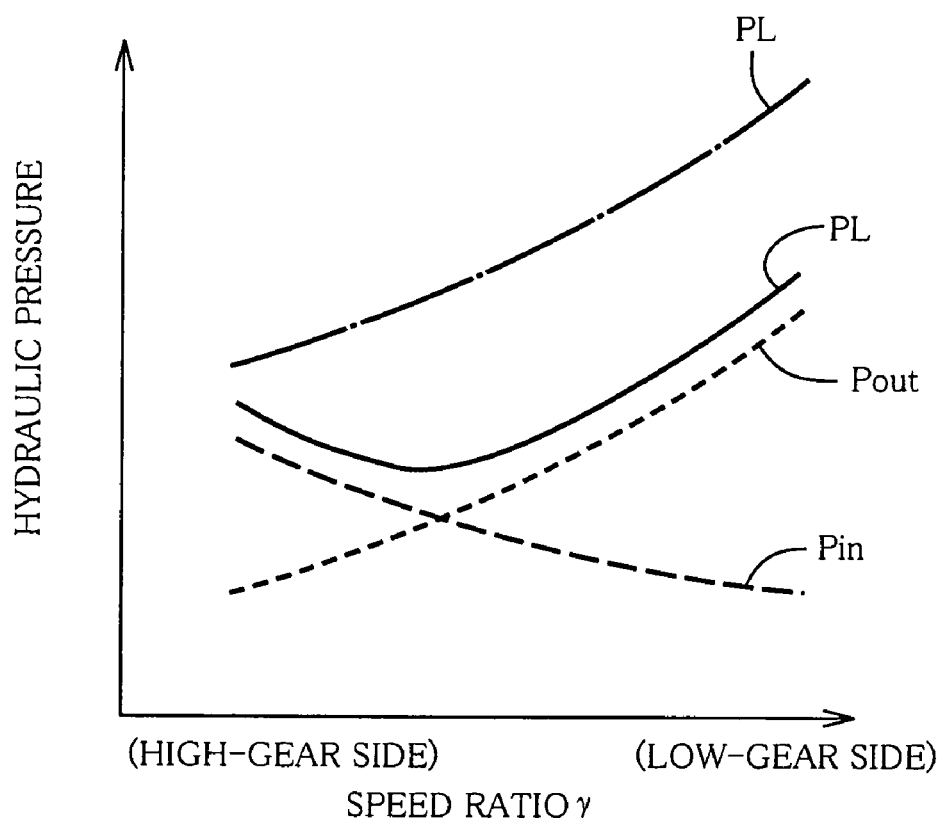
FIG. 6 is a graph indicating changes of belt-tensioning hydraulic pressure Pout, transmission-shifting hydraulic pressure Pin and line pressure PL, which are controlled by the hydraulic control system.

Step S2 is followed by step S3 in which the amount of electric current to be applied to the linear solenoid valve SLS is controlled to control its control pressure PSLS for suitably regulating the belt-tensioning hydraulic pressure Pout, while at the same time the amount of electric current to be applied to the linear solenoid valve SLT is controlled to control its control pressure PSLT for suitably regulating the line pressure PL and the No. 2 modulator pressure PM2 (namely, the coupling hydraulic pressure of the forward-drive clutch C1). Since the linear solenoid valve SLS is assigned to regulate only the belt-tensioning hydraulic pressure Pout, the linear solenoid valve SLS permits adequate control of the belt-tensioning hydraulic pressure Pout depending upon the vehicle running condition such as the speed ratio γ of the continuously variable transmission 18 and the operating amount θacc of the accelerator pedal, so that the transmission belt 48 of the continuously variable transmission 18 is protected from an excessively high load. Further, the control pressure PSLT of the linear solenoid valve SLT is simply required to be controlled to obtain a higher one of the line pressure PL and the No. 2 modulator pressure PM2 depending upon the running state of the vehicle, so that the line pressure PL is prevented from being unnecessarily high when the speed ratio γ is relatively high (while the continuously variable transmission 18 is in a relatively low-gear state). Therefore, the line pressure PL can be controlled to be a required minimum level slightly higher than the higher one of the belt-tensioning hydraulic pressure Pout and the transmission-shifting hydraulic pressure Pin, as indicated by solid line in FIG. 6, so that an undesirable energy loss due to the unnecessarily high line pressure PL can be avoided.

In the present embodiment, the forward-drive clutch C1 functions as a frictional coupling device to be engaged for forward running of the vehicle, and the No. 2 modulator pressure PM2 corresponds to a coupling hydraulic pressure to be applied to the forward-drive clutch C1, for placing the forward-drive clutch C1 in its fully engaged state, while the line-pressure modulator No. 2 valve 110 functions as a coupling-pressure regulating valve.

If the shift lever 64 has been just operated from the neutral position N to the forward-drive position D, that is, if the vehicle is in the process of starting immediately after the operation of the shift lever 64 to the forward-drive position D, an affirmative decision (YES) is obtained in step S1, and the control flow goes to step S4 in which the on-off solenoid valve SL1 is energized to apply its pilot pressure to the clutch-apply control valve 80, for placing this control valve 80 in its control state. As a result, the control pressure PSLS received from the linear solenoid valve SLS is applied from the output port 90 to the primary regulator valve 70 and the line-pressure modulator No. 2 valve 110, so that the line pressure PL and the No. 2 modulator pressure PM2 are regulated according to the control pressure PSLS. At the same time, the control pressure PSLT received from the linear solenoid valve SLT is applied from the output port 92 to the forward-drive clutch C1 through the manual valve 120, so that the engaging action of the forward-drive clutch C1 is controlled according to the control pressure PSLT.

Step S4 is followed by step S5 in which the amount of electric current to be applied to the linear solenoid valve SLS is controlled to control its control pressure PSLS for suitably regulating the belt-tensioning hydraulic pressure Pout and the line pressure PL depending upon the vehicle running condition such as the speed ratio γ, while at the same time the amount of electric current to be applied to the linear solenoid valve SLT is controlled to control its control pressure PSLT for assuring a smooth engaging action of the forward-drive clutch C1. Since the control pressure PSLT of the linear solenoid valve SLT is applied to only the forward-drive clutch C1, the transient coupling hydraulic pressure to be applied to the forward-drive clutch C1 can be adequately controlled, without a risk of a rise of the belt-tensioning hydraulic pressure Pout to an unnecessarily high level due to the transient coupling hydraulic pressure applied to the clutch C1, so that the durability of the transmission belt 48 and the power transmitting efficiency of the continuously variable transmission 18 are improved. It is noted that the control pressure PSLT corresponds to the transient coupling hydraulic pressure.

On the other hand, the linear solenoid valve SLS is required to regulate the belt-tensioning hydraulic pressure Pout and the line pressure PL. Therefore, if the relationship between the line pressure PL and the belt-tensioning hydraulic pressure Pout is determined on the basis of the transmission-shifting hydraulic pressure Pin higher than the belt-tensioning hydraulic pressure Pout when the speed ratio γ is relatively low, the line pressure PL tends to be unnecessarily high when the speed ratio γ is in a medium-to-high range, as indicated by one-dot chain line in FIG. 6. Although this tendency results in reduction of energy efficiency of the hydraulic system, this takes place only in the process of the engaging or coupling action of the forward-drive clutch C1, so that the overall energy efficiency during an entire period of control of the clutch C1 including a time length of the full engagement of the clutch C1 during steady running of the vehicle, as well as a time length of the transient engaging or coupling action of the clutch C1, is significantly improved.

Step S5 is followed by step S6 to determine whether the forward-drive clutch C1 has been fully engaged. This determination is made by determining whether the speed Nin of the input shaft 36 has become equal to the speed NT of the turbine shaft 34. The linear solenoid valves SLS and SLT are continuously controlled in step S5, that is, step S5 is repeatedly implemented, until the clutch C1 has been fully engaged, that is, until an affirmative decision (YES) is obtained in step S6. When the affirmative decision is obtained in step S6, the control flow goes to step S7 in which the clutch-apply control valve 80 is switched to the normal state.

It will be understood from the foregoing description of the illustrated embodiment that a portion of the electronic control device 50 assigned to implement steps S1, S2, S4, S6 and S7 constitutes a switching control portion, and that this switching control portion cooperates with the clutch-apply control valve 80 of the hydraulic control unit 30 to constitute a hydraulic-circuit switching device.

In the hydraulic control system of the present embodiment for the vehicular power transmitting mechanism, it is not necessary to regulate the transient coupling hydraulic pressure during the steady running of the vehicle while the forward-drive clutch C1 is held in its fully engaged state with the No. 2 modulator pressure PM2 (coupling hydraulic pressure) generated by the line-pressure modulator No. 2 valve 110. Therefore, the line pressure PL can be regulated according to the control pressure PSLT applied from the linear solenoid valve SLT to the primary regulator valve 70, while the belt-tensioning hydraulic pressure Pout applied to the continuously variable transmission 18 can be regulated by the linear solenoid valve SLS. Accordingly, the line pressure PL and the belt-tensioning hydraulic pressure Pout can be adequately controlled. The present hydraulic control system permits the line pressure PL to be controlled as indicated by solid line in FIG. 6, and prevents an unnecessary rise of the line pressure PL while the speed ratio γ of the continuously variable transmission 18 is in the medium-to-high range, as indicated by one-dot chain line in FIG. 6.

When the forward-drive clutch C1 is switched from its fully released state to its fully engaged state during starting of the vehicle, for example, the line pressure PL as well as the belt-tensioning hydraulic pressure Pout is regulated by the linear solenoid valve SLS, with the control pressure PSLS being applied to the primary regulator valve 70, while the transient coupling hydraulic pressure (namely, the control pressure PSLT) of the forward-drive clutch C1 is regulated by the linear solenoid valve SLT. Accordingly, an increase of the transient coupling hydraulic pressure PSLT will not cause an increase of the belt-tensioning hydraulic pressure Pout to an unnecessarily high level, so that the durability of the belt 48 and the power transmitting efficiency of the continuously variable transmission 18 are improved. Although the use of the same linear solenoid valve SLS for controlling the belt-tensioning hydraulic pressure Pout and the line pressure PL causes an unnecessarily increase of the line pressure PL in the process of the engaging or coupling action of the clutch C1 to its fully engaged state while the speed ratio γ is relatively high (while the continuously variable transmission 18 is in a relatively low-gear state) as indicated by one-dot chain line in FIG. 6, this occurs only in the process of the engaging action of the clutch C1, and the line pressure PL can be adequately controlled after the clutch C1 has been fully engaged, so that the overall energy efficiency of the hydraulic system is significantly improved.

The hydraulic control system of the present embodiment is further arranged to use the two linear solenoid valves SLS and SLT for regulating the belt-tensioning hydraulic pressure Pout, the transient coupling hydraulic pressure PSLT of the forward-drive clutch C1, and the line pressure PL, so that the present hydraulic control system can be made more compact and smaller in size, and is available at a lower cost of manufacture, than a hydraulic control system using three linear solenoid valves for regulating the above-indicated three pressures, respectively.

The present embodiment is further arranged that the single clutch-apply control valve 80 is used to selectively apply the first and second control pressures PSLS and PSLT to the primary regulator valve 70, and selectively apply the No. 2 modulator pressure PM2 and the control pressure PSLT to the forward-drive clutch C1, so that the present hydraulic control system can be made further compact, small-sized and inexpensive.

While the preferred embodiment of this invention has been described in detail by reference to the accompanying drawings, for illustrative purpose only, it is to be understood that the present invention is not limited to the details of the preferred embodiment, but may be embodied with various changes, modifications and improvements which may occur to those skilled in the art, in the light of the foregoing teachings.

What is claimed is:

1. A hydraulic control system for a vehicular power transmitting mechanism including a hydraulically operated continuously variable transmission of a belt-and-pulley type which includes a transmission belt and a speed ratio of which is continuously variable, and a hydraulically operated frictional coupling device which is capable of being engaged, for running of a vehicle, to establish a power transmitting path partially defined by the continuously variable transmission, said hydraulic control system comprising:

a first linear solenoid-operated valve operable to generate a first control pressure for regulating a belt-tensioning hydraulic pressure for applying a tension to said transmission belt of said continuously variable transmission;

a second linear solenoid-operated valve operable to generate a second control pressure for regulating a transient coupling hydraulic pressure to be applied to said frictional coupling device in a process of an engaging action from a fully released state to a fully engaged state;

a line-pressure regulating valve operable to regulate a line pressure used for hydraulically operated devices of the vehicular power transmitting mechanism;

a hydraulic-circuit switching device operable to switch hydraulic circuits such that, (i) for placing said hydraulically operated frictional coupling device in said fully engaged state, the hydraulic pressure of said hydraulically operated frictional coupling device and the line pressure are controlled by the second linear solenoid-operated valve, and the belt-tensioning hydraulic pressure is controlled by the first linear solenoid-operated valve, and (ii) during said hydraulically operated frictional coupling device being in the process of said engaging action, the belt-tensioning hydraulic pressure and the line pressure are controlled by the first linear solenoid-operated valve, and said second control pressure outputted from the second linear solenoid-operated valve is supplied to said frictional coupling device as said transient coupling hydraulic pressure; and a coupling-pressure regulating valve operable to generate a coupling hydraulic pressure to be applied to said frictional coupling device placed in said fully engaged state, wherein said hydraulic-circuit switching device includes a control-pressure switching valve which is arranged to receive said first control pressure, said second control pressure and said coupling hydraulic pressure, and which has: 1) a normal state in which said second control pressure is applied to said line-pressure regulating valve and said coupling-pressure regulating valve while said coupling hydraulic pressure is applied to said frictional coupling device, and 2) a control state in which said first control pressure is applied to said line-pressure regulating valve while said second control pressure is applied to said frictional coupling device as said transient coupling hydraulic pressure, said hydraulic-circuit switching device further including a switching control portion operable (i) to judge said fully engaged state and said process of said engaging action of said first linear solenoid-operated valve, and (ii) to switch said control-pressure switching valve to said normal state when placement of said frictional coupling device in said fully engaged state is judged, and (iii) to switch said control-pressure switching valve to said control state when process of said engaging action of said frictional coupling device is judged.

2. The hydraulic control system according to claim 1, the first control pressure is continuously variable with a change of an amount of electric current applied to the first linear solenoid valve.

3. The hydraulic control system according to claim 1, the second control pressure is continuously variable with a change of an amount of electric current applied to the second linear solenoid valve.

4. The hydraulic control system according to claim 1, wherein said coupling-pressure regulating valve receives said second control pressure when said control-pressure switching valve is placed in said normal state, said coupling-pressure regulating valve generating said coupling hydraulic pressure such that the generated coupling hydraulic pressure changes according to said second control pressure.

5. The hydraulic control system according to claim 1, further comprising an on-off solenoid valve operable to generate a pilot pressure, wherein said control-pressure switching valve is placed selectively in said normal state and said control state, depending upon whether said pilot pressure is present or not.

6. The hydraulic control system according to claim 1, wherein said switching control portion includes determining means for determining whether said frictional coupling device is held in said fully engaged state or in the process of said engaging action, depending upon whether a shift lever provided for manually controlling said vehicular power transmitting mechanism is held in a drive position or has been just operated from a neutral position to said drive position.

* * * * *